UNITED STATES PATENT OFFICE.

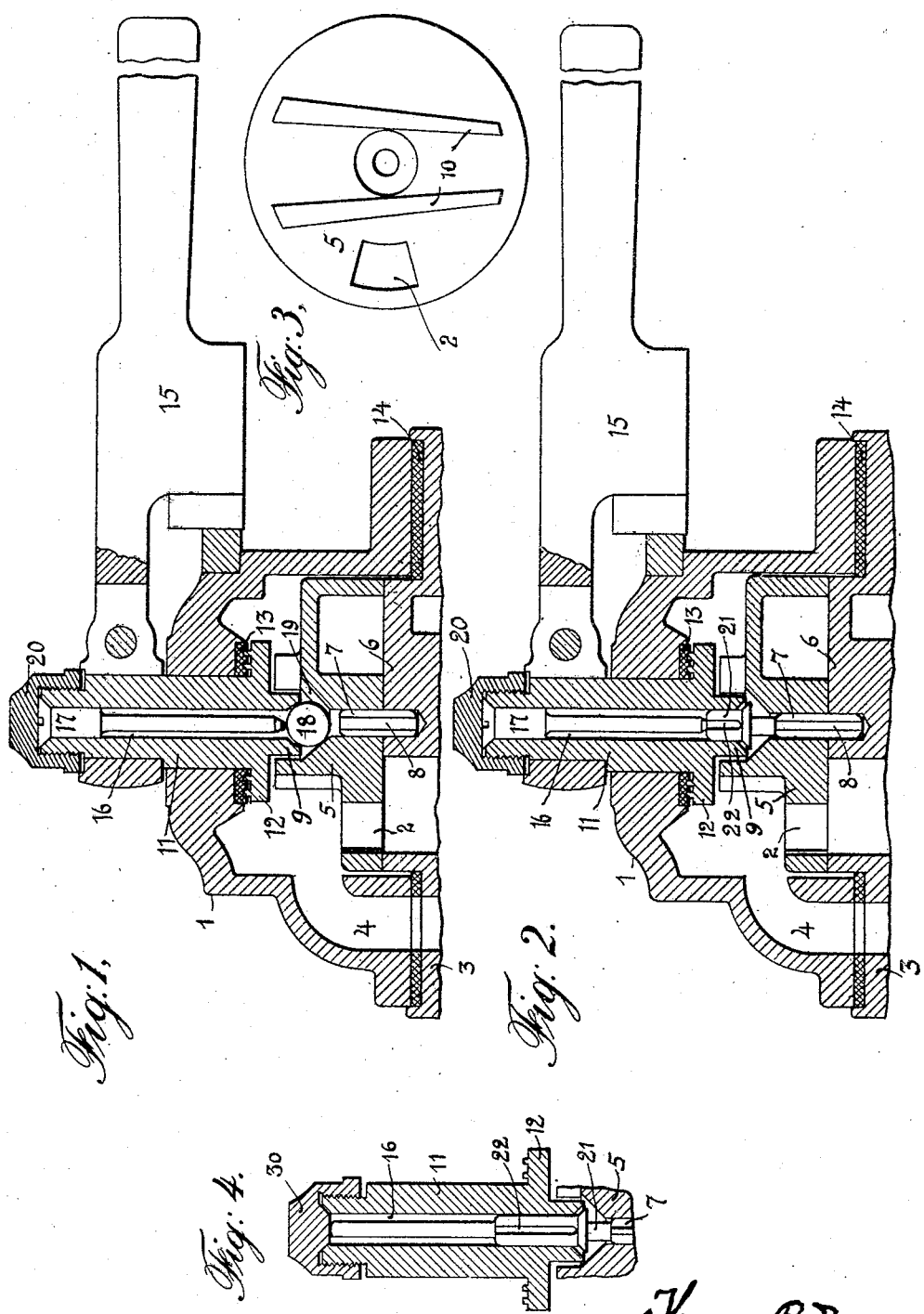

THOMAS R. BROWN, OF WEMPLE, NEW YORK.

FLUID-PRESSURE-VALVE-LUBRICATING MECHANISM.

No. 796,985.  Specification of Letters Patent.  Patented Aug. 15, 1905.

Application filed February 29, 1904. Serial No. 195,704.

*To all whom it may concern:*

Be it known that I, THOMAS R. BROWN, a citizen of the United States, residing at Wemple, in the county of Albany and State of New York, have invented certain new and useful Improvements in Fluid-Pressure-Valve-Lubricating Mechanism, of which the following is a specification.

My invention relates to a means for enabling a slide-valve to be properly lubricated in a valve mechanism which is operated under fluid-pressure without releasing the pressure from the valve mechanism or taking the casings of the mechanism apart.

I have shown my invention as applicable to the proper lubrication of the rotary valve of an engineer's brake-valve forming part of an air-brake system while the brake-valve is charged with fluid under pressure; but I do not limit my invention to a valve device in the air-brake art.

Referring to the drawings, Figure 1 is a vertical section through the upper cap or casing, the rotary valve and the valve-section of an engineer's brake-valve similar to that illustrated in the United States patent to Corrington, No. 729,044, dated May 26, 1903. Fig. 2 is a similar section of the same device, showing a modified construction. Fig. 3 is a top view or plan of the rotary valve, and Fig. 4 is a detail showing a modification of Figs. 1 and 2.

In Fig. 1 the cap or upper section 1 is fastened in any convenient manner to the valve-seat section 3, with a gasket 14 interposed between. A passage 4 represents the means for admitting fluid under pressure to the casing 1 from a source of fluid-supply, such as an air pump or reservoir. The valve 5, having through it a port 2, rotates upon the valve-seat 6, which is part of the casing-section 3, and is held concentric with its seat by a pin 7, placed in a hole through the center of the valve, which may be either winged or a loosely-fitting rod, or it may have a groove 8 in its side. Through the casing 1 a shaft 11 extends, having on its lower end a disk 12, bearing upon a gasket 13 to prevent any leak about the shaft, and also having a tenon or key 9, fitting in usual manner a correspondingly-shaped slot or mortise on the top of valve 5 between the lugs 10, Fig. 3. The shaft 11 has fastened in any convenient manner to its upper end a handle 15, by moving which through a horizontal plane the shaft and the valve 5 may be moved or rotated back and forth, as convenience may require. The shaft 11 has a port or passage 16 through its center and a valve-seat at each end thereof. A valve 17 extends through the port 16 and is securely held upon the upper seat by a cap-nut 20. A ball 18, preferably of steel, rests over a port through the center of the valve above the pin 7 and is adapted to fit the seat at the lower end of the shaft 11 and prevent the escape of pressure through the port 16.

The operation is as follows: Fluid under pressure being admitted through passage 4 into the cap-section 1 and above and around the valve 5, when it is desired to lubricate said valve, the cap-nut 20 is removed, and the fluid under pressure seeking to escape through port 16 lifts the valve 17 from its seat, so that it can be readily removed, and at the same time the ball 18 is likewise lifted upward by the pressure seeking to escape against the seat at the lower end of shaft 11, thus closing port 16. A supply of oil or other lubricant is then admitted into the passage 16, after which the valve 17 is replaced and the cap 20 screwed down, so as to hold said valve upon its seat. At the same time the valve-stem pushes the ball 18 away from its upper seat, which then drops down upon the valve 5 and permits the oil to flow downward past the ball and through the groove 19 very slowly into the space occupied by the pin 7, from which it is gradually distributed between the valve 5 and the valve-seat 6. As the valve 5 is rotated back and forth the oil gradually finds its way from the center outward to the outer edges of the valve.

Fig. 2 represents substantially the same organization of parts, excepting that the steel ball 18 is replaced by a valve 21, which corresponds practically in function with the ball 18. This may be a winged valve, or it may have a groove 22 on one side. As in Fig. 1, when the valve 17 is removed the valve 21 is seated upwardly by the fluid-pressure underneath it closing port 16, and when the valve 17 is replaced it pushes the valve 21 away from its seat, which then rests upon pin 7.

Fig. 4 represents a modification in which the stem of valve 21 is made longer and the under side of cap or cover 30 closes the passage 16 and unseats valve 21 when the parts are put together, as illustrated. The valve 17 may therefore be dispensed with, since the cap 30 performs the function alone of closing port 16. It is apparent that as soon as the cap 30 is removed for admitting lubricant to passage 16 valve 21 seats upwardly and closes said passage.

I claim—

1. The combination of a valve upon a seat and subject to fluid under pressure, there being a port or passage for admitting lubricant to the bearing-surface of said valve, a cover for normally closing said port and means for automatically preventing the escape of pressure and permitting the admission of lubricant through said port while said cover is removed.

2. The combination of a valve upon a seat and subject to fluid under pressure, there being a passage for admitting lubricant to the bearing-surface of said valve, a manually-operated cover for normally closing said passage and a valve automatically closing to prevent escape of pressure when said cover is removed for the admission of lubricant.

3. The combination of a valve upon a seat inclosed within a casing and subject to fluid under pressure, a shaft extending through the casing for operating the valve, said shaft having a passage for admitting lubricant to the valve, a cover for normally closing said passage at one end and a valve automatically seating to close the passage at the other end when the cover is removed.

4. The combination of a valve upon a seat inclosed within a casing and subject to fluid under pressure, a shaft extending through the casing for operating the valve, said shaft having a passage for admitting lubricant to the valve and two valves for alternately opening and closing the passage at either end.

5. The combination of a valve upon a seat inclosed within a casing and subject to fluid under pressure, means extending through the casing for operating the valve and having a passage for admitting lubricant to the valve and means for alternately opening and closing the passage at different points to admit lubricant while preventing escape of pressure.

THOMAS R. BROWN.

Witnesses:
　SHERWOOD PHILLIPS,
　W. A. SNYDER.